(12) United States Patent
Britton et al.

(10) Patent No.: US 9,848,277 B2
(45) Date of Patent: Dec. 19, 2017

(54) HIGH-SPEED APPLICATION FOR INSTALLATION ON MOBILE DEVICES FOR PERMITTING REMOTE CONFIGURATION OF SUCH MOBILE DEVICES

(71) Applicant: Samsung Electronics Co., Ltd., Suwon-si, Gyeonggi-do (KR)

(72) Inventors: Douglas Britton, Washington, DC (US); Andrew Michael Wesie, Austin, TX (US); Brian Sejoon Pak, Austin, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 14/729,927

(22) Filed: Jun. 3, 2015

(65) Prior Publication Data

US 2015/0350806 A1 Dec. 3, 2015

Related U.S. Application Data

(60) Provisional application No. 62/007,078, filed on Jun. 3, 2014.

(51) Int. Cl.
*H04W 4/02* (2009.01)
*H04W 72/04* (2009.01)
(Continued)

(52) U.S. Cl.
CPC .......... *H04W 4/001* (2013.01); *G06F 3/0482* (2013.01); *G06F 21/57* (2013.01); *H04L 63/12* (2013.01);
(Continued)

(58) Field of Classification Search
CPC ..... H04W 4/001; H04W 4/003; H04W 12/10; H04W 8/205; H04L 63/12; G06F 21/57; G06F 3/0482; H04M 1/72525
See application file for complete search history.

(56) References Cited

U.S. PATENT DOCUMENTS

| 6,151,606 A | 11/2000 | Mendez |
| 7,702,322 B1 | 4/2010 | Maurya et al. |

(Continued)

FOREIGN PATENT DOCUMENTS

| WO | WO-2013030296 A1 | 3/2013 |
| WO | WO-2013180697 A1 | 12/2013 |

OTHER PUBLICATIONS

International Search Report and Written Opinion issued by the U.S. Patent and Trademark Office as International Searching Authority for International Application No. PCT/US15/34044 dated Sep. 3, 2015 (9 pgs.).

*Primary Examiner* — Joseph Dean, Jr.
(74) *Attorney, Agent, or Firm* — Jefferson IP Law, LLP

(57) ABSTRACT

The system and method include a high-speed application for installation on mobile devices to enable the configuration of an abstract number of devices simultaneously. The application includes the capability to configure smart devices remotely or via secure local connections. The system and method include a mechanism for creating desired configuration states, an interactive portal through which these configurations may be selected and modified, and an application for installation on each target device that retrieves the desired configuration and applies it to the mobile device before returning verification reports for confirmation and auditing purposes.

17 Claims, 13 Drawing Sheets

(51) Int. Cl.
*H04W 4/00* (2009.01)
*H04M 1/725* (2006.01)
*H04W 8/20* (2009.01)
*G06F 3/0482* (2013.01)
*H04W 12/10* (2009.01)
*G06F 21/57* (2013.01)
*H04L 29/06* (2006.01)

(52) U.S. Cl.
CPC ....... *H04M 1/72525* (2013.01); *H04W 4/003* (2013.01); *H04W 8/205* (2013.01); *H04W 12/10* (2013.01)

(56) References Cited

U.S. PATENT DOCUMENTS

| | | | |
|---|---|---|---|
| 7,970,386 | B2 | 6/2011 | Bhat et al. |
| 8,359,016 | B2 | 1/2013 | Lindeman et al. |
| 8,516,095 | B2 | 8/2013 | Eisener et al. |
| 8,695,058 | B2 | 4/2014 | Batchu et al. |
| 8,862,105 | B2 | 10/2014 | Lindeman et al. |
| 2005/0073982 | A1* | 4/2005 | Corneille .......... H04L 29/12066 370/338 |
| 2008/0025243 | A1 | 1/2008 | Corneille et al. |
| 2009/0320110 | A1* | 12/2009 | Nicolson ................ G06F 21/57 726/6 |
| 2012/0254762 | A1 | 10/2012 | Parmar et al. |
| 2014/0096024 | A1* | 4/2014 | Laurent ................ G06F 21/128 715/739 |
| 2014/0215451 | A1* | 7/2014 | Nachtigal ............... G06F 9/445 717/171 |

* cited by examiner

HIGH-SPEED APPLICATION FOR INSTALLATION ON MOBILE DEVICES FOR PERMITTING REMOTE CONFIGURATION OF SUCH MOBILE DEVICES

RELATED APPLICATIONS

The present application claims the benefit under 35 U.S.C. §119(e) of U.S. Provisional Patent Application Ser. No. 62/007,078 entitled, High-Speed Application for Installation on Mobile Devices for Permitting Remote Configuration of Such Mobile Devices, filed Jun. 3, 2014, the contents of which are incorporated herein by reference in its entirety.

FIELD OF THE INVENTION

The present invention relates to large-scale mobile device configuration and facilitation of information technology audits of such devices.

BACKGROUND OF THE INVENTION

Information technology ("IT") administrators have used personal computer ("PC") imaging tools, such as Ghost® of Symantec, Inc., to create and deploy configurations of these computers called "Golden Images." Deploying a "Golden Image" to a PC makes that PC's system substantially identical to the ideal configuration in terms of applications, settings, drivers, etc. These Golden Images can be deployed to thousands of PCs in a matter of minutes, eliminating the need to manually configure each machine individually, which provides a substantial savings in time and labor. Further, when there is the manual configuration of a number of PCs, it introduces the risk for variations and errors, leading to slight variations in the behavior of such PCs on which mistakes are made or configuration steps are missed or improperly applied.

Deploying custom "Golden Images" to mobile smart devices, such as smart phones, cannot be performed in the traditional manner used for PCs because of advancements and alterations in many of the security techniques applicable to mobile smart devices. For the purposes of the present invention, "smart devices" include, but is not limited to, smart phones, tablet devices, personal digital assistants ("PDAs"), etc., hereinafter collectively referred to as "smart devices."

As the distribution and provisioning of smart devices becomes increasingly prevalent in the government and commercial sectors, organizational rollouts may necessitate numerous standardized configuration steps between factory builds and end-user delivery. In this context, large-scale smart device configuration becomes a significant investment. Currently, there exists no smart device equivalent for Symantec's Ghost® to establish baseline configurations for Android-based systems, and up to 75% of mobile security breaches result from basic misconfiguration.

There are three primary obstacles that make the translation of Symantec Ghost®-esque tools to Android-based small device systems difficult. First, the Android Operating System ("OS") architecture substantially prevents direct access to persistent memory storage ("Flash" memory) and does not provide a mechanism to reboot smart devices into a mode that would allow IT administrators to directly write applications, configure systems, or input data onto a large number of devices simultaneously. Second, Android-based application storage mechanisms are not standardized and absent such standardization across Android applications, IT administrators cannot reliably determine how to automate the insertion of data to configure the applications. This applies since the inaccessibility of persistent memory storage may be circumvented by inserting data into pre-determined locations in application folders. Third, manufacturers and carriers may exert certain controls over smart device OSs that rigorously structure the method by which Android systems can be configured. Any technique seeking to create a common configuration across multiple devices has to work within the confines of running OSs and the prescribed mechanisms for configuring/altering the smart devices.

At present, smart device configuration is executed either manually or with partially automated ("pre-staging") by IT administrators, integrators, carriers, or equipment manufacturers. Combining setup steps and corporate data, such as usernames, email addresses, and passwords, along with quality assurance and testing may require from several minutes per device to over an hour of smart device processing time. Therefore, if an enterprise with hundreds or thousands of smart devices is forced to configure them, it may be required to devote weeks or months of man-hours to the manual setup and data entry, while incurring the rollout risk of erroneous configurations, help-desk calls, and re-working. This same type of manual activity is required to conduct compliance checks and IT audits, which often require active insight into baseline configurations of enterprise devices. Absent an automated and remote method of assuring that a number of smart devices are in compliance with designated configurations, IT administrators are required to physically inspect each smart device during an IT audit.

Currently there is existing technology that attempts to address these challenges. This technology is primarily directed to services known as Mobile Device Management ("MDM" services. These services are also referred to as Enterprise Mobility Management or Mobile Application Management Services. MDM products primarily focus on the active management of devices rather than their initial configuration. The techniques of these products typically have limited configuration capabilities, including VPN setup, application installation, and allowing or disallowing installation of applications from unknown sources. Examples of such services include MobileIron, Inc. See, U.S. Pat. No. 8,359,016, titled "Management of Mobile Applications," U.S. Pat. No. 8,695,058, titled "Selective Management of Mobile Device Data in an Enterprise Environment," and U.S. Pat. No. 8,862,105, titled "Management of Mobile Applications." There is also, the services of Good Technology, Inc. that provide these limited services. See, U.S. Pat. No. 6,151,606, titled "System and Method for Using a Workspace Data Manager to Access, Manipulate, and Synchronize Network Data," U.S. Pat. No. 7,970,386, titled "System and Method for Monitoring and Maintaining a Wireless Device"; and U.S. Pat. No. 7,702,322, titled "Method and System for Distributing and Updating Software in Wireless Devices."

In the smart device configuration environment, MDM suites are limited to exclusively programmatic methods of configuring devices, i.e., executing some subset of the application program interface ("API") calls already programmed into the device's capabilities. This limitation relating to programmatic configuration is that not all device or application settings are accessible through exclusively programmatic methods, especially third-party applications that are not integrated with the APIs. Therefore, unless there is specific support built into the Android-based OS or other OS for an API call to perform an action and the MDM service supports that API call, MDMs are not capable of executing that action or affect any associated settings or configurations whether they are Android settings, native application configurations, third-party application configurations, or user-specific data fields. As a result, a significant number of smart device configuration steps require input through human touch interaction with the device rather than programmatic interaction using APIs.

An alternative technology to MDM services that has been applied to the field of mobile device configuration is a USB-facilitated solution termed "Rubber Ducky." While such a usage is a significant divergence from the intended use of Rubber Ducky, which is described as a keystroke injection attack platform, Rubber Ducky may be used to execute programs on smart devices by acting as a surrogate keyboard interface through the ubiquitous human interface device ("HID") USB standard. While only limited configuration of smart devices in this manner may be possible, implementation is neither feasible nor likely to succeed, and the manipulation of smart devices would be limited to only such actions as can be executed through keyboard interaction.

While existing MDM services and tools to interface with smart devices may be suitable for their particular designed purpose, there are presently no systems capable of universally manipulating smart devices on a large scale through both programmatic interaction and simulations of traditional human touch interaction with a device. Further, there is no element that presently exists that is capable of assuring compliance with IT audits or device compliance checks by remotely re-configuring a large number of smart devices to the desired baseline configuration. There is a need for systems and methods to overcome these problems.

SUMMARY OF THE PRESENT INVENTION

The present invention is directed to a system and method that includes a smart device application and browser administration portal that automates end-to-end bulk configuration, deployment, and quality assurance of smart devices. Unlike conventional systems installed on smart devices that are limited to interacting only with OSs and policies on such devices, the system of the present invention provides IT administrators with the capability to control the applications and OSs of smart devices on which it is installed. It can function in both offline and over-the-air scenarios, supports substantially all API calls as opposed to only a subset, and allows for the configuration of substantially all native Android-based settings, as well as, third party and in-house applications by simulating human touch interaction with the smart device. The verification stage of the system of the present invention maintains an audit trail for IT compliance purposes, and on-demand configuration allows for streamlined IT audits. Although the system and method of the present invention are preferably for Android-based systems, it would be understood by a person of ordinary skill in the art that it is applicable to other smart device OSs, including Apple OSs.

The system of the present invention, which may be in the form of a downloadable computer application, overcomes a lack of direct access to memory, non-standardized application storage, and manufacturer and carrier limitations on smart devices by simulating human touch interaction with the smart device. Preferably, through the use of a scripting language that interacts with a user interface ("UI") automator, the present invention is capable exerting control over a smart device both programmatically and through simulated touch events to configure any setting that a human user would be capable of configuring, removing the necessity for application-specific integration.

As a configuration occurs, the application of the present invention programmatically verifies that the desired settings are applied and produces a report suitable for compliance audits. Configurations can be re-applied as needed in cases of spot audits or compliance checks in which the high-speed application of the present invention runs a check to ensure that all configuration settings are still in place, corrects those that are erroneous, and provides a report for auditing purposes.

In view of the present invention's capacity for automation, IT administrators experience a significant reduction in the number of labor hours required to configure large numbers of smart devices, such as on an enterprise level. Smart devices can be configured in parallel, without limitations on the number of configurations that can be running simultaneously. The present invention also enables configuration directly by end-users rather than IT administrators, automating the process for the end-user and generating a report indicating whether or not the configuration was successful. By varying the system and method of the present invention, manual quality assurance checks are no longer required, fewer security breaches due to misconfigured devices occur, and IT help desk requests stemming from misconfigurations decrease.

The method of the present invention provides an easy and reliable way by which a smart device may be configured and that translates into a saved configuration state. This is accomplished by the development of a programming method that enables the generation of settings modules replicating how human users interact with smart devices. Through instructions, such as touches at a particular coordinate grid or searches for text elements on the screen, the interactions that humans perform can become instructions for software. Leveraging the capacity of Android-based OSs to mimic touch events and queries of the screen status into an intuitive novel way provides the present invention with benefits over conventional systems.

Additional advantages of the system and method of the present invention are that it overcomes inconsistencies in UIs, UI renderings, and load times. These are overcome by the use of image comparison, xpath searches to directly examine XML elements rendered on the screen, and the generation of separate modules for each type of smart device and OS version. Given the extensive control over smart devices provided by the application of the present invention, security issues are overcome by signing configurations with a private key and prohibiting the application of the present invention from running unsigned configurations. These and other features of the present invention will be described in greater detail in the reminder of the specification referred to the drawings.

BRIEF DESCRIPTION OF THE DRAWINGS

Various other objects, features, and attendant advantages of the present invention will become fully appreciated as the same becomes better understood when considered in conjunction with the accompanying drawings, in which like reference characters designate the same or similar parts through the several views, and wherein.

DESCRIPTION OF THE PREFERRED EMBODIMENT

The present invention is directed to a smart device application and browser-based administration portal that provides end-to-end bulk configuration, deployment, and quality assurance of smart devices. The browser-based portal is available to system administrators or system users through any internet-enabled web browser, e.g. Internet Explorer, FireFox, or Chrome. The browser-based portal is associated with the computer-based system that includes the system server. The present invention provides the capability of controlling the applications and OSs of smart devices on which it is installed. The present invention permits the configuration of a number of smart devices simultaneously and programmatically verifies that the desired settings are applied and produces a report suitable for compliance audits.

For purposes of the present invention, the following definitions apply:

"Configuration" means a group of setting modules assigned to particular users or devices that, as a whole, constitute a desired ideal state to be provisioned to a given smart device or number of smart devices.

"Device" means a smart device.

"Setting Module" means an individual component of a configuration that delineates the series of instructions required to reach the desired state of a particular setting or carry out a specific task.

"System User" means an administrative user responsible for authoring configurations using a web portal by selecting setting modules, entering required data into setting modules, and inputting user and device data.

"Users" means an end-user of the application installed on a smart device, namely, the user of the smart device.

Figure 1:
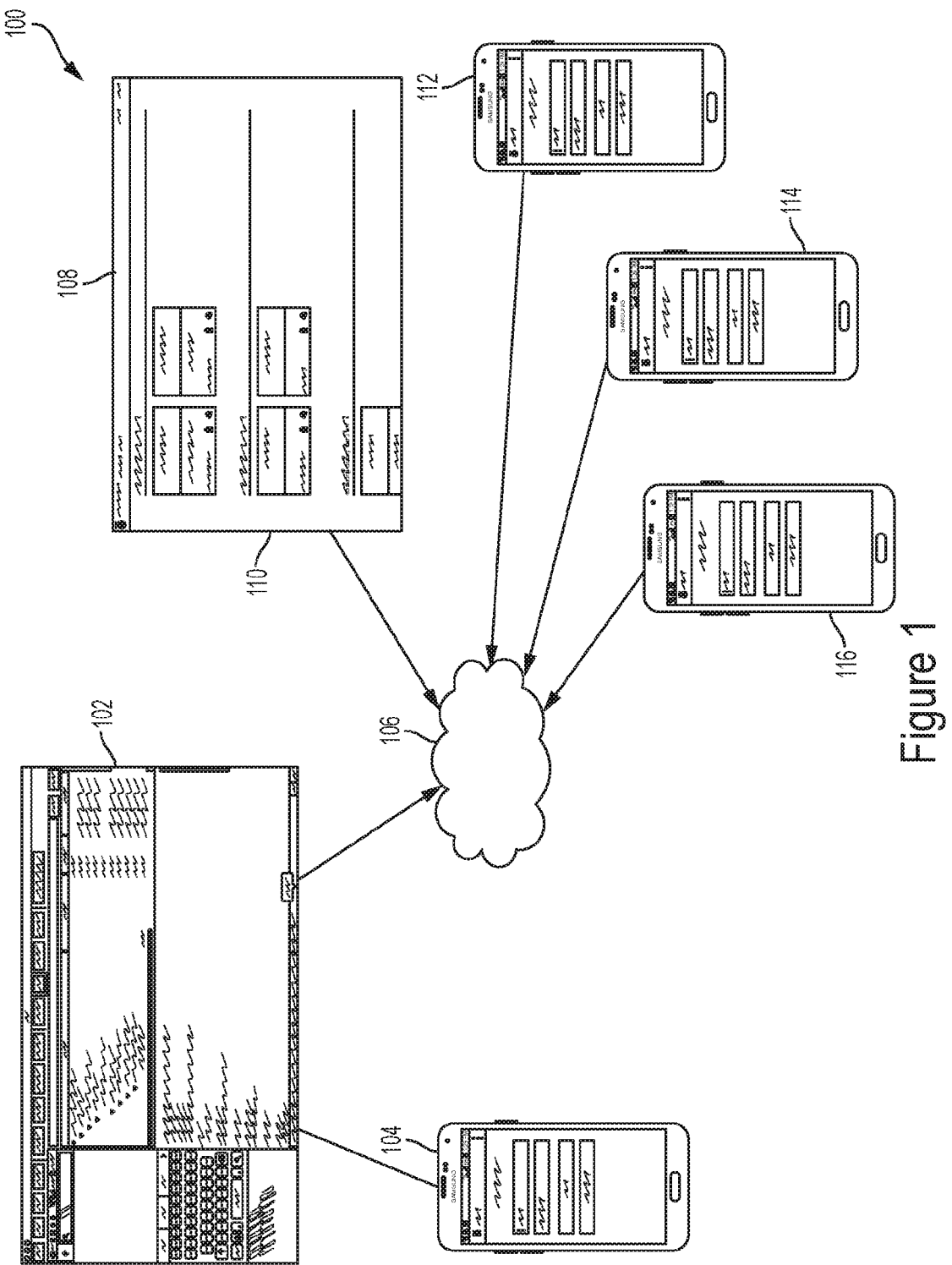
FIG. 1 shows a representative overview diagram of the system and method the present invention that shows the interaction between settings modules, configurations, and smart devices on which the system and method of the present invention may be installed.

Referring to FIG. 1, generally at 100, an overview of the system and method of present invention are shown. According to FIG. 1, setting creation module 102 connects to smart device 104, which may be an Android-based device. A system user, such as a software developer, may use an internal tool, such as, a Debug UI interface (discussed subsequently), in conjunction with smart device 104 to construct setting modules, which are responsible for changing settings on smart devices. These setting modules are stored on servers that may be part of cloud 106. However, these servers may be located at a remote location other than in the cloud and it would still be within the scope of the present invention.

Cloud 106 for purposes of the present invention may be capable of carrying out Internet-based wireless communications with respect to the system and method the present invention.

Referring to FIG. 1, web portal 108 may be used by a system administrator to determine which setting modules are to be bundled into a given configuration, such as the configuration at 110, and enters any requisite data into the data fields associated with those setting modules. Once the system administrator determines with setting modules and data are to be included in a configuration at 110, web portal 108 communicates that information to the servers that are part of cloud 106. These servers package the desired setting modules and personalize data into a configuration, cryptographically sign the configuration, and store that configuration for future use. The configurations at 110 are associated with specific login credentials to be used on applications running on one or more of the representative mobile devices 112, 114, and 116.

Referring to mobile devices 112, 114, and 116, when the application according to the system and method of the present invention is run, it requests a specific configuration at 110 from the servers in cloud 106 based on the login credentials and device of origin, in accordance with the settings selected by the administrator using web portal 108. The servers in cloud 106 determine if the received login credentials match any available configurations at 110 assigned to those credentials from the type of mobile device, such as, mobile device 112, 114, or 116, that initially sent the credentials. If there is an available configuration at 110 associated with that combination of credentials and device, the configuration is sent to the appropriate mobile device, such as, mobile device 112, 114, or 160, which checks the cryptographic signature to ensure that the configuration originated from the servers of cloud 106 and verify its integrity. The application according to the system and method the present invention will then apply the appropriate configuration from the configurations at 110 to the appropriate mobile device 112, 114, 116, and communicates a report to the servers indicating whether or not the configuration was applied successfully. A system administrator using the web portal 108 may then request a configuration report from the servers of cloud 106 in order to determine the status of the configuration of mobile devices 112, 114, or 116, as appropriate.

Now that an overview of the system and method of the present invention has been described, further details about the elements of the system and method the present invention will now be described.

Figure 2A:
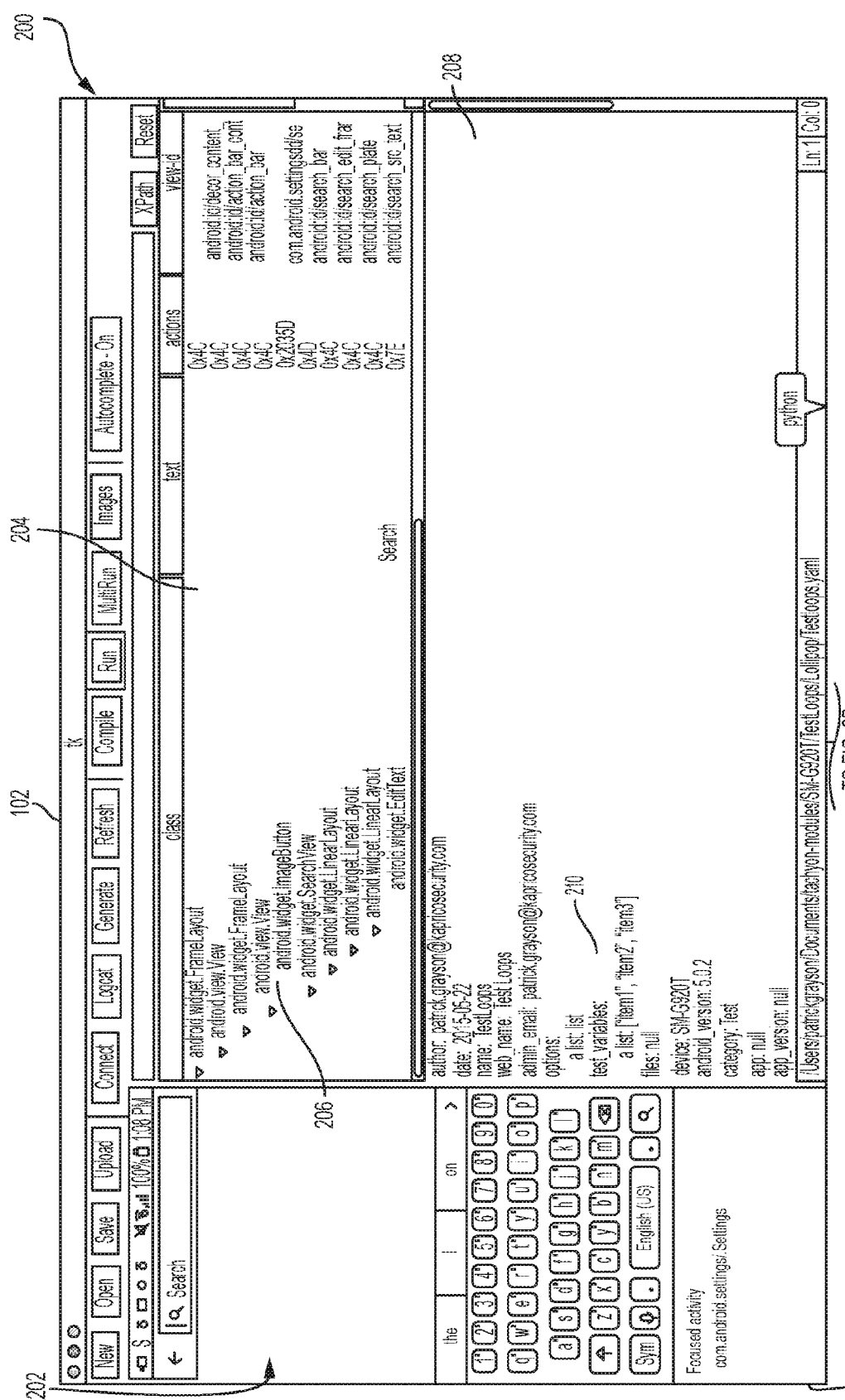
FIG. 2A shows a first portion of a representative diagram of system elements for setting module creation shown in FIG. 1.
Figure 2B:
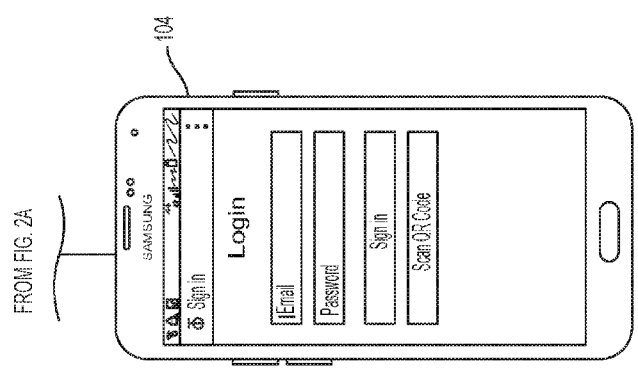
FIG. 2B shows a second portion of representative diagram of system elements for setting module creation shown in FIG. 1.

Referring to FIGS. 2A and 2B, generally at 200 and 104 respectively, the method by which setting modules are created will be described. According to the present invention, setting modules are created using a specialized novel user interface referred to as a "debug UI" that is part of what is shown generally at 102 of FIG. 2A. Smart device 104 of FIG. 2B connects to debug UI 102 of FIG. 2A, which is displayed on a local personal computer, by a USB connector, preferably, with an Android debug bridge ("ADB") and the high-speed application of the present invention is installed on the smart device.

Debug UI 102 is capable of communicating with the application according to the present invention that is installed on smart device 104, as well as, retrieving data used for debugging purposes from the smart device itself using the ADB. Once this communication is established, the application according to the present invention that is installed on smart device 104 transmits a unique device token to the debug UI. The token is used to request a signature file from the servers. Without the signature file, no further information will be transmitted from the application of the present invention to the debug UI and no information will be transmitted from the debug UI to the application of the present invention installed on smart device 104.

Debug UI 102 includes a number of features once a connection is established between debug UI 102 and smart device 104. These features display various data to system users, such as a software developer. At 202 of debug UI 102, an image of the smart device screen at the time when the smart device was last queried is shown. A hierarchy of XML nodes retrieved from the smart device when it was last queried is shown at 204. The full Android activity name that was in the foreground when the smart device was last queried is shown at 205.

In order to build an xpath search for a specific XML node, debug UI 102 permits the system user to select a XML node, such as the one at 206, from what is shown at 204. When this is done, debug UI will examine the XML attributes of the node selected at 206 and attempt to find a subset of attributes that no other node in the current hierarchy has the same values for all the attributes i.e., a unique xpath query. If a unique set of attribute values can be identified for the selected XML node, an appropriate xpath query will be generated. If this is not the case, the system user will be informed of that by debug UI 102 via a popup dialog box prompting the system user to find an alternate method for referencing the XML node.

So that the system user may be able to locate an XML node within the hierarchy shown at 204, the application according to the present invention makes it possible select a visible UI element from the smart device image at 202. When the system user does so, the area at 207 will be searched for the smallest XML node containing coordinates selected in the image. This capability is supported because each XML node has a bounding box defined by (X,Y) coordinate of the top left corner combined with the width and height indicator, which is shown at smart device image 202 upon clicking a particular XML node.

Debug UI 102 also includes Debug UI editor panel ("editor panel") 208. The system user, such as a software developer, may use editor panel 208 to enter commands for the construction of setting modules. These commands are shown generally at 210. The commands entered by the system user preferably are in the form of instructions at 210 that are written in a preferred setting module language. These instructions may use xpath quarries, the activity name, or other values including Android-based action codes, e.g., click, long click, scroll, etc., and references to APIs, which the application of the present invention can resolve.

Some of the most important setting modules include, but are not limited to, ones for logging into email, installing applications, enrolling in MDM systems, encryption, and password settings.

Figure 3:
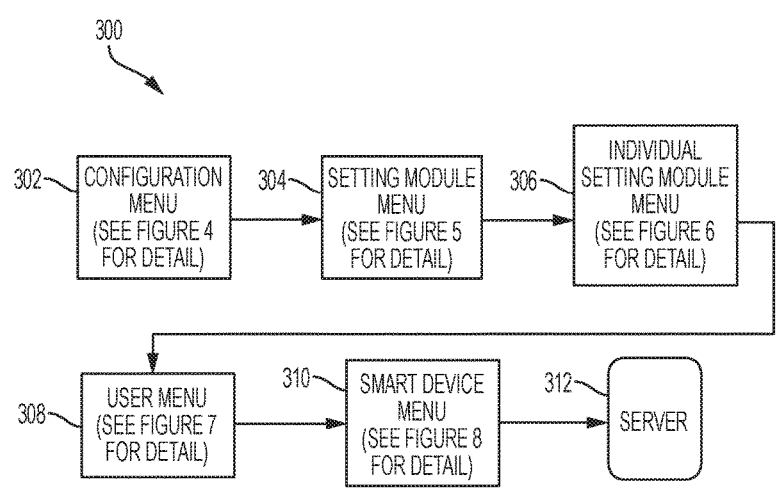
FIG. 3 shows a representative diagram of the system elements for creating configurations and assigning those configurations to particular users and smart devices.

Referring to FIG. 3, generally at 300, the elements of the system of the present invention for creating and storing configurations are shown. These include configuration menu 302, setting module menu 304, individual setting module menu 306, user menu 308, smart device menu 310, and server 312, which as previous described may be disposed in cloud 106.

Configuration menu 302 feeds into setting module menu 304 and individual module menu 306. After those menus are accessed, user menu 308 and smart device menu 310 continue the process of configuration creation, assigning users and devices to the created configurations before the configurations are stored in server 312. These elements will be described in detail referring to FIGS. 3-8.

Figure 4:
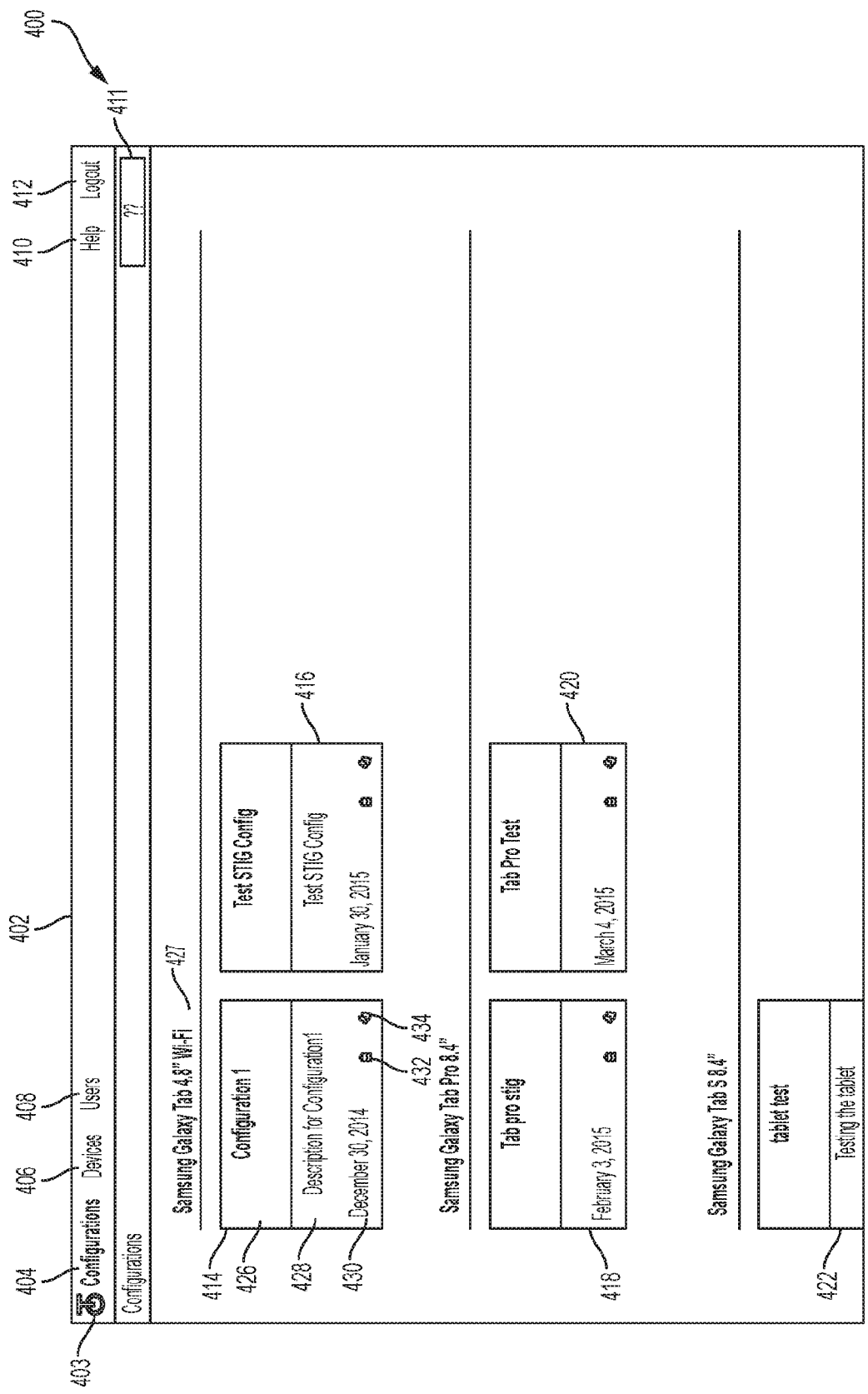
FIG. 4 shows a representative detailed diagram of the configuration menu of the system of the present invention shown in FIG. 3.

Referring to FIGS. 3 and 4, the configuration menu will be described in detail. In FIG. 4, a detailed view of the configuration as shown generally at 400. The configuration process is initiated by an administrator through the use of configuration menu 400 that is associated with a web portal. The configuration menu includes a navigation section 402. The section permits the administrator or system user to navigate to the different menus needed for creating a configuration and saving that configuration. The navigation section includes home page link 403, configuration link 404, devices link 406, users link 408, helper button 410, and logout button 412.

Configurations link 404 permits an administrator or system user to connect to the configurations menu shown in FIG. 4. Devices link 406 permits an administrator or system user to connect to devices menus, such as is shown at 310 in FIG. 3. Users link 408 permits an administrator or system user to connect to users menus, such as is shown at 308 in FIG. 3. Home link 403, help button 410, and logout button 412 operate conventionally as would be known by a person of ordinary skill in the art.

Configuration menu 400 also includes new configuration button 411. This button is for an administrator or system user to initialize the configurations that are shown on configuration menu 400. "Initialize" as it is used herein means beginning the process of creating a configuration by providing a name for the configuration and selecting devices to which it will apply. For example, this button may be used to initialize any of the configurations that are shown at 414, 416, 418, 420, and 422 for the specific smart devices shown in the list to which they are associated. To continue the process of creating a configuration, an administrator or system user will select a given configuration, such as the configuration shown at 414. When the administrator or system user clicks on a given configuration, such as configurations 414, 416, 418, 420, or 422, it will open setting module menu 304, which is shown in detail in FIG. 5.

Again referring to FIG. 4, with regard to each of the configurations shown at 414, 416, 418, 420, and 422, there is specific information provided. The smart device with which configurations 414 and 416 are associated is "Samsung Galaxy Tab 4 8" Wi-Fi," which is shown at 424. The configurations at 418 and 420 are associated with a smart device named "Samsung Galaxy Tab Pro 8.4"." And, the smart device associated with configuration 422 is "Samsung Galaxy Tab S 8.4"."

Configuration 414 has the name of the configuration shown at 426. If the administrator or system user clicks on configuration 414, it would link to setting module menu 304 in FIG. 3 or the detailed view of the setting module menu at 500 in FIG. 5. At 428, a description of the configuration is provided. Again, if a description of the configuration is clicked on, it will link to setting module menu 304 in FIG. 3 or the detailed view of the setting module menu at 500 in FIG. 5. The date the configuration was created is shown at 430. The button to delete the configuration is shown at 432 and the button to copy the configuration is shown at 434. The administrator or system user may copy the configuration for the purpose of constructing a similar configuration using the original as an initial template. This information is provided for each configuration that has been created.

Figure 5:
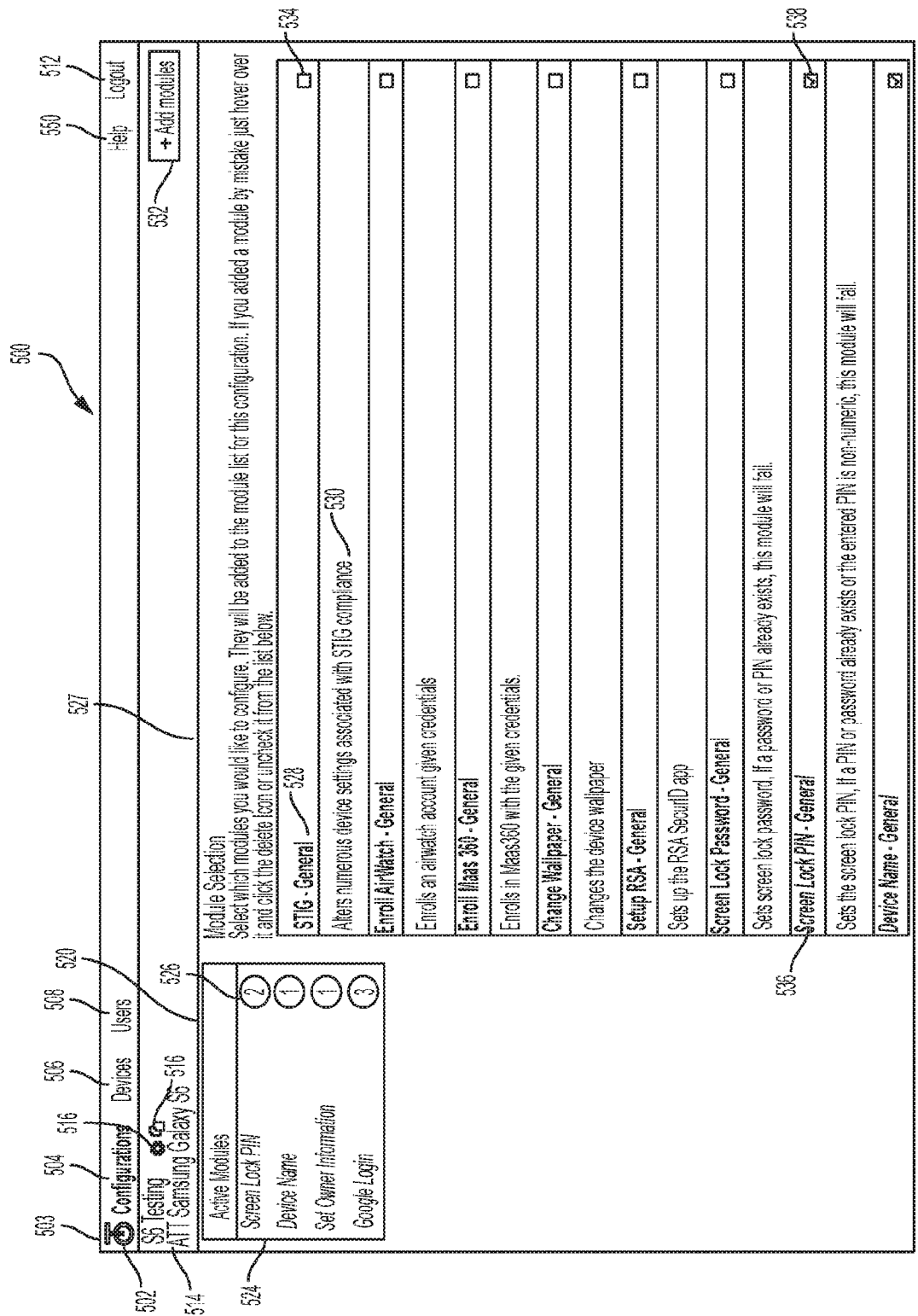
FIG. 5 shows a representative detailed diagram of the setting module menu of the system of the present invention shown in FIG. 3.

As stated, if the configuration is clicked on, it will link to setting module menu 304 in FIG. 3 or the detailed view of the setting module menu at 500 in FIG. 5. Referring to FIG. 5, navigation section 502 is shown. Navigation section 502 is the same as navigation section 402 that is shown in FIG. 4 with respect to configuration menu 400. That is, home links 403 and 503, configuration links 404 and 504, smart device links 406 and 506, user links 408 and 508, help buttons 410 and 510, and log out buttons 412 and 512 are substantially the same and the descriptions respect to these navigation section items with respect to FIG. 4 apply equally to FIG. 5.

Referring to FIG. 5, the configuration name with which the setting module menu 500 is associated is shown at 514. For example, in FIG. 5, it shows that the associated configuration is "S6 Testing" for an "ATT Samsung Galaxy S6." Further, setting module menu 500 provides editing button 516, which will open an editing menu for editing information on the setting module menu, such as usernames, passwords, and other configurable information, and a duplication button at 518 for opening a duplication menu when activated. This duplication button is used for the purpose of providing a template for constructing a similar configuration.

FIG. 5 includes active modules section 520 and available modules section 522. Active modules section 520 includes the modules that the administrator or system user has selected that will be part of the configuration that is being created. At present, active modules section 520 shows that the administrator or system user has selected four modules. For each module that is selected, active modules section 520 will display the module name at 524 and the number of settings in the actual module at 526.

Available modules section 522 includes, for example, module name at 528 and a description of the module below it at 530. This convention is followed with respect to each of the modules listed.

The method by which an administrator or system user can add a module to the active module list at 520 is through the use of "+Add modules" button 532. In order to add a module using add modules button 532, the administrator or system user will check the checkbox, for example, checkbox 534, associated with the module to be added and then click add modules button 532. This will cause the module(s) to be added to active module section 520. When the modules are added, their names will be added and the color will change in 527, for example, like the name "Screen Lock PIN-General" at 536, and the checkbox, for example, the checkbox at 538, will display a visual check.

When an administrator or system user selects any of the individual modules shown in active modules section 520, it will enable the administrator or system user to access the settings for that particular module. In making such a selection, it will open individual setting module menu 306 in FIG. 3 or the detailed view of the individual setting module menu in FIG. 6, shown generally at 600.

Figure 6:
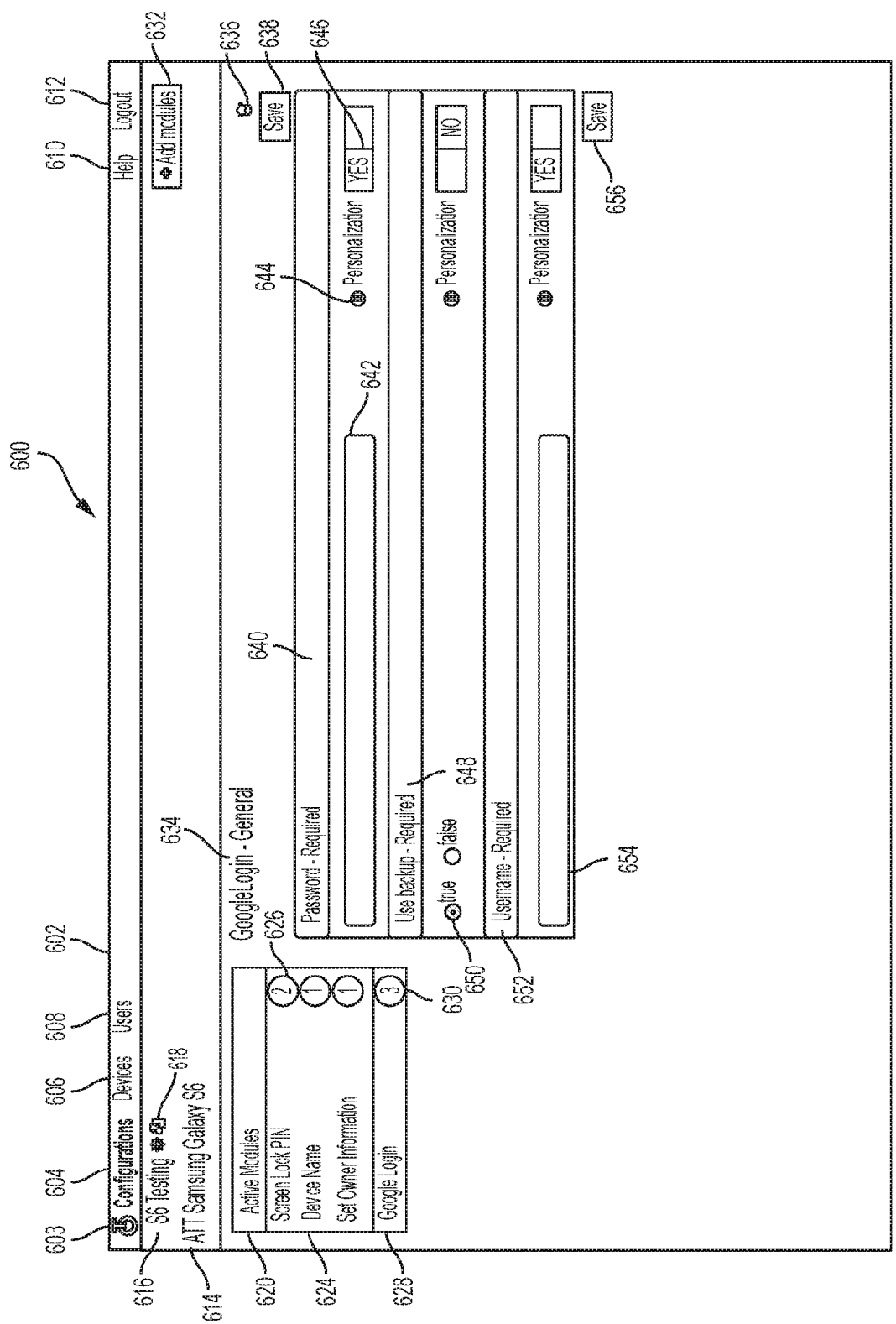
FIG. 6 shows a representative detailed diagram of the individual setting module menu of the system of the present invention shown in FIG. 3.

Referring to FIG. 6, navigation section 602 is shown. Navigation section 602 is the same as navigation section 402 that is shown in FIG. 4 with respect to configuration menu 400. That is, home links 403 and 603, configuration links 404 and 604, smart device links 406 and 606, user links 408 and 608, help buttons 410 and 610, and log out buttons 412 and 612 are substantially the same and the descriptions respect to these navigation section items with respect to FIG. 4 apply equally to FIG. 6.

Again referring to FIG. 6, the configuration name with which the individual setting module menu 600 is associated is shown at 614. For example, in FIG. 6, it shows that the associated configuration is "S6 Testing" for an "ATT Samsung Galaxy S6." Further, individual setting module menu 600 provides editing button 616, which will open an editing menu for editing information on the setting module menu, and a duplication button at 618 for opening a duplication menu when activated. The actions of these buttons are the same as those that have previously described bearing the same name. Further, individual settings module menu 600 includes +Add modules button 632, which may be used as previously described with respect to FIG. 5 at 532 for adding modules. The description at 532 of FIG. 5 applies equally to 632 of FIG. 6 respect to the add modules button.

In FIG. 6, active modules are shown at 620. These active modules are the same that are shown in FIG. 5 at 520. Active modules 620 show the module names at 624 and the number of settings in any active module at 626. If an active module is selected from the list of active modules at 620, it will be highlighted as shown at 628 where the module "Google Login" is highlighted. It also shows that the Google Login module has three setting modules. When an administrator or the system user clicks on Google Login 628, it will open the three setting as shown at 634. The three settings include "Password" setting 640, "Use backup" setting 648, and "Username" setting 652.

Individual setting module menu 600 menu is used to enter specific settings for a particular setting module. This may be accomplished by inputting global data values for desired settings and by determining if a particular setting module will load personalized data. What is displayed for the selected active module, such as Google Login 628, will be the setting module fields at 634. The setting module fields at 634 include various ways to change/adjust the settings for a module. The setting module fields include, but are not limited to, input fields for global data and toggle switches to indicate whether the data is to be personalized per user at a later step, radio buttons to select among other options, and drop down fields for selecting one of several options. For purposes of the present invention "Radio buttons" mean a set of buttons for a specific setting, only one of which can be selected.

Again referring to FIG. 6, the setting module fields 634 include delete button 636, which may be used to delete the selected active module. Further, the settings module fields at

634 include save button 638, which may be used to save changes that been made to the data in the fields for the selected active module.

As shown in FIG. 6, there are the three settings at 634. These are at 640, 648, and 652. A password setting 640 provides an area 642 for entering data for changing the password. At 646, the administrator or system user may choose whether to make the information personalized. For purposes of the present invention, "personalized" means data or information specific to a single user rather than globally across all users of the given smart device type. Further, there is a button 644, which when activated will provide information about the personalized button. For example, this information includes, but is not limited to, a description of how personalized information functions within the context of the web portal and the application of the present invention, similar to a "help" feature.

Use backup setting 648 includes toggle selection 650. As shown, "true" is selected for the setting to indicate that use backup will be required. As with the password setting at 640, the administrator or system user may choose to make the selection personalized and there is a button provided by which information about the personalization button will obtain when activated.

Username setting 652 includes area 654, which may be used for entering change information for the setting. As with the two previously described settings, there is a capability for personalization of the settings and the ability to obtain information about the personalization button.

Save button 656, when activated, will save the changed information that has been entered by the administrator or system user. This button operates the same as save button 638 that was described previously. Once the information has been saved, the next step in the configuration creation process is to close individual settings module menu 600, which reopens setting module menu 500. Now it will be time to associate the configurations that have been created with system users and smart devices.

Figure 7:
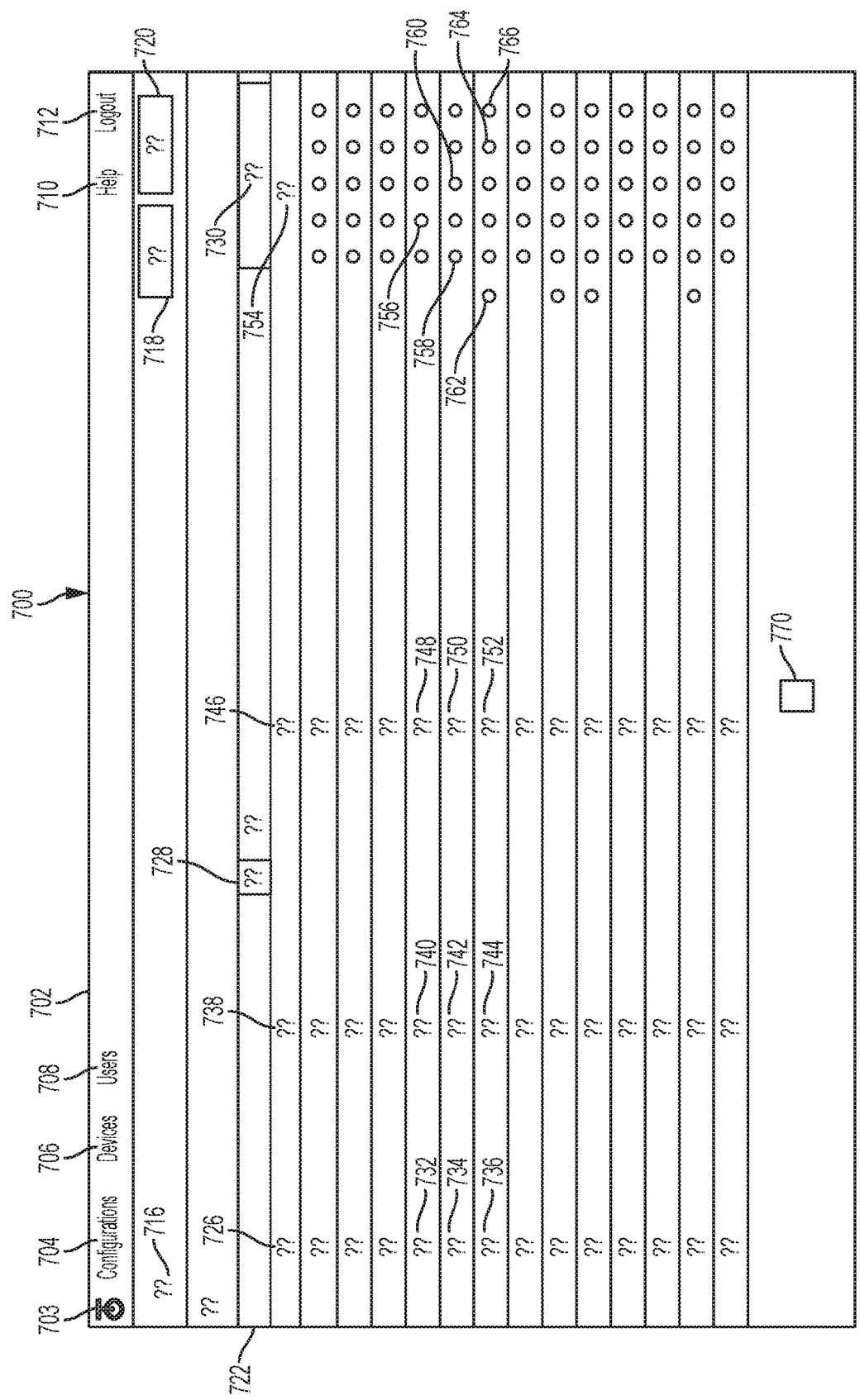
FIG. 7 shows a representative detailed diagram of the user menu of the system of the present invention shown in FIG. 3.

Referring to FIG. 3 at 308, the user menu is shown in conjunction with the other system elements. As shown at 308, a detailed view of the user menu is shown at FIG. 7. Referring to FIG. 7, generally at 700, the detailed view of the user menu is shown. User Menu 700 is used for inputting users into the system for the purpose of configuring them, which includes assigning them devices using user menu 700 or using device menu 310 in FIG. 3 for this purpose. That is, the device menu can in turn assign configurations on device menu 310 to users.

Navigation section 702 is the same as navigation section 402 that is shown in FIG. 4 with respect to configuration menu 400. That is, home links 403 and 703, configuration links 404 and 704, smart device links 406 and 706, user links 408 and 708, help buttons 410 and 710, and log out buttons 412 and 712 are substantially the same and the descriptions respect to these navigation section items with respect to FIG. 4 apply equally to FIG. 7.

Again referring to FIG. 7, the title of the page is shown at 716, which in this case is "Users." User menu 700 contains information about users added to the server via add user button 718. Add user button 718 can be used by an administrator or system user to add users to user data section 722. The administrator or system user can provide information for a single user and then click add user button 714 to add that user to the server. The administrator or system user also has option of providing information relating to a number of users. In this latter method, the administrator or system user preferably uploads user information as a CSV (comma separated value) file populated with the information of multiple end-users. Upon upload of a CSV file, the administrator or system user will activate bulk import button 720 and the user data will be automatically entered into user data section 722.

Add user button 718 permits user information, such as name, email, status, and certain tags, to be associated with users upon initialization. That is, names will be entered in name column 726, email addresses in email column 738, status in status column 746, and actions in actions columns 754. Once this user information is entered in section 722, this will give administrators and system users the capability to provide users with access to the application of the present invention through direct email, production of quick response ("QR") codes, or via logins to be used at a later time.

With regard to status column 746, different types of information may be displayed. For example, at 748, it indicates that the user has been assigned more devices than have been configured. At 750, it indicates that all assigned devices have been configured. Lastly, at 752, it indicates that no devices have been assigned to the user at this time.

User data section 722, as previously disclosed, preferably, includes, but is not limited to, user name column 726, email column 738, status column 746 and action column 754 for tags that an administrator or system user may assign. User data section 722 also allows for changes to the users, including, but not limited to, renaming users, such as at 732, 734, or 736, changing email addresses, such as at 740, 742, or 744, changing the status of users, such 748, 750, or 752, and altering the assigned tags, such as the tags at 756, 758, 760, 762, 764, or 766. More specifically, the action tag at 756 is for editing user information; the action tag at 758 is for adding devices to users; the action tag at 760 is for emailing application login information to users; the action tag at 762 is for retrieving audit report information from configurations already executed; the action tag is 764 is for displaying application QR code login information; and the action tag at 766 is for deleting the line entry for that specific user information line.

FIG. 7 also includes search area 728. This permits the administrator or system user to search for users that are listed in user data section 722. This Figure also includes filter button 730. Filter button 730 is used to filter users shown in user data 722 by various criteria. This criteria includes, but is not limited to, the full name and email address. And, at 770 the page number of the user menu is shown.

Figure 8:
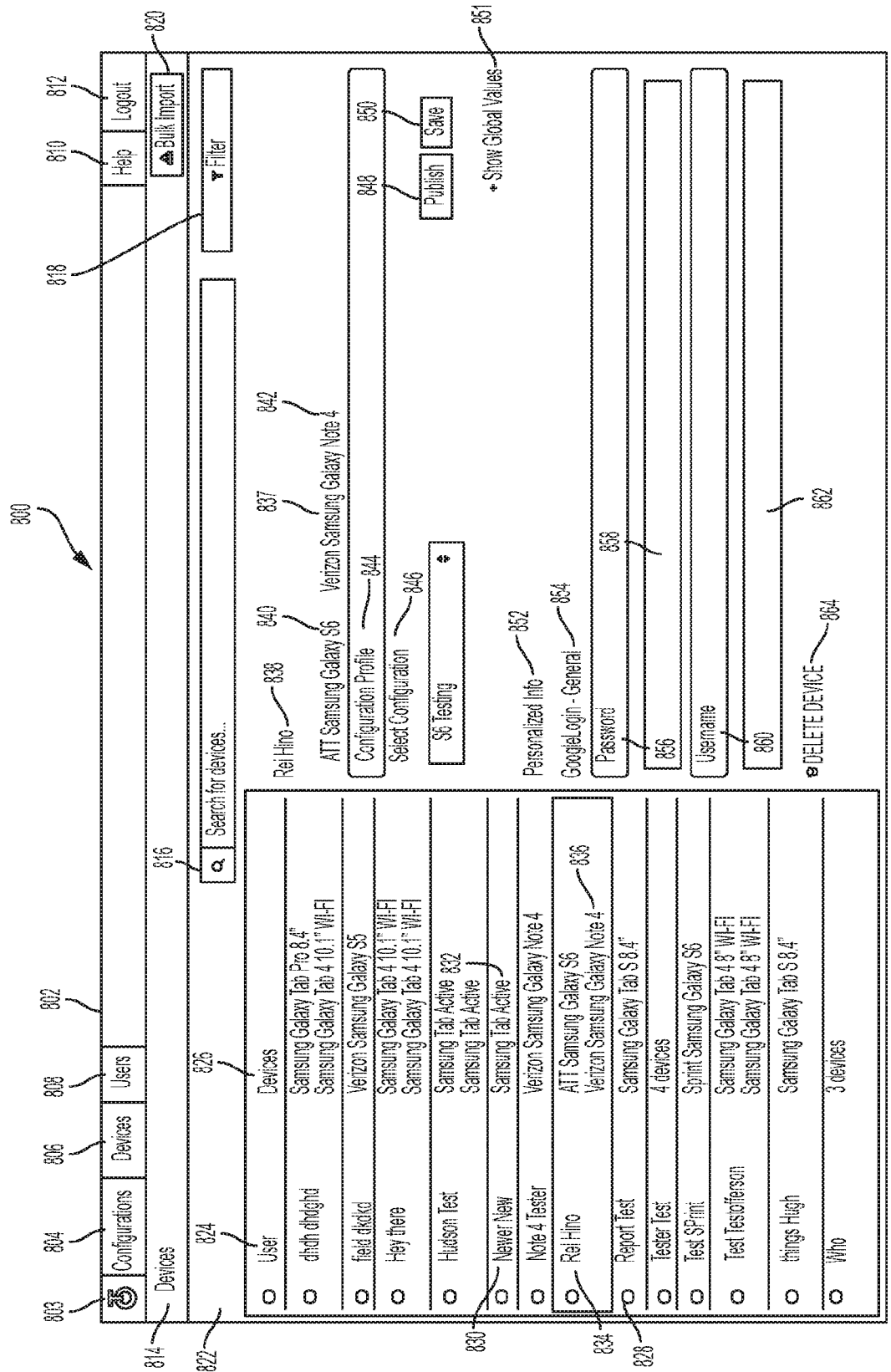
FIG. 8 shows a representative detailed diagram of the smart device menu of the system of the present invention shown in FIG. 3.

As previously stated, smart device menu 310 may also be used to assign devices to users. As indicated at 310 in FIG. 3, a detailed view of the smart device menu is shown in FIG. 8. Therefore, referring to FIG. 8, the smart device will be described.

Referring to FIG. 8, generally at 800, the smart device menu is shown. Smart device menu 800 includes navigation section 802. Navigation section 802 is the same as navigation section 402 that is shown in FIG. 4 with respect to configuration menu 400. That is, home links 403 and 803, configuration links 404 and 804, smart device links 406 and 806, user links 408 and 808, help buttons 410 and 810, and log out buttons 412 and 812 are substantially the same and the descriptions respect to these navigation section items with respect to FIG. 4 apply equally to FIG. 8.

Referring to smart device menu 800, this menu may be used to associate configurations with devices and to input personalized information into the settings of setting modules if enabled in the setting module fields at 634 in FIG. 6. Using smart device menu 800, an administrator or system user may select users on an individual or bulk basis from user information section 822. Selected users will cause the opening each user in information section 837 for editing. Information section 837 displays the devices with respect to the selected user and this allows administrators or system users to switch between different devices, as well as, a drop down menu in which administrators or system users may choose which configuration is to be applied to a given device. This drop down menu is shown at 846. If a setting module in a configuration is set to receive personalized data, options will appear for inputting that information in information section 837. In the absence of personalized information to be entered, information section 837 will display an option to see the global data values selected in the setting module fields at 634 in FIG. 6.

Referring to FIG. 8, smart device menu 800 will be described in greater detail. The title of the smart device menu is shown at 814. The user data is shown at 822. User data at 822 includes username column 824 and device column 826, which shows the devices that are associated with each user. For example, user Newer New 830 has device Samsung Tab Active device 832 associated with it. Further, user Rei Hino 834 has two devices associated with it, which are shown at 836. These devices are ATT Samsung Galaxy S6 and Verizon Samsung Galaxy Note 4.

Each username has a checkbox next to it, such as checkbox 828, which is next to username Rei Hino. This checkbox is selected if the administrator or system user desires to apply changes to the information related to a user or its assign device(s). Therefore, if there is a check placed in checkbox 828, it will cause the opening of information section 837 when the administrator or system user clicks on the username.

As shown in information section 837, the username of the selected user is shown at 838. The tabs for the assigned devices are shown at 840 and 842. It would be understood by person of ordinary skill in the art that there would be a tab for each assigned device. With respect to user Rei Hino, the selected device tab is the one for ATT Samsung Galaxy S6 at 840.

The configuration profile for the selected device, ATT Samsung Galaxy S6, is shown at 844. With respect to this configuration profile, a selection drop-down menu is provided at 846. The administrator or system user may select which configuration is desired. If there is selection that is made that is desired to be applied, then the administrator or system user will activate save button 850 to save the configuration. The administrator or system user may also activate publish button 848 for publishing the configurations to server 312 after verifying that all information has been correctly recorded. More specifically, the publish option for configuration profile 844 prompts the compiler to check the configuration for valid xpaths and commands, sign the configuration, associate the configuration with specific login credentials and devices, and store it on server 312 for use. Further, the administrator or system user has the option of activating show global values button 851, which will display all global values for the configuration, which will include, but not be limited to, installed applications, WiFi settings, etc.

With respect to user Rei Hino 838, personalized information is shown at 852. The administrator or system user has the ability to change information in this section. For example, the module title for which there is associated personalized information is shown at 854. In this case, the module is "GoogleLogin-General." The personalized information associated with username 838 includes password 856 and username 860. If the administrator or system user desires to change the password, this information may be added at 858 and if it is desired to change the username, this information may be added at 862.

If the administrator desires to the delete the device in the system in general, such as ATT Samsung Galaxy S6, from a user, such as Rei Hino, the system user will activate delete device button 864.

The FIG. 8 also include search area 816. This permits the administrator or system user to search for users that are listed in user data 822. This Figure also includes filter button 818. Filter button 818 is used to filter users shown in user data 822 by various criteria. This criteria includes, but not is not limited to, full usernames, user email addresses, and smart device models.

As an alternative to entering multiple fields of personalized information individually, the administrator or system user may use bulk import button 820. According to this process, the administrator or system user will receive a downloadable CSV file containing all categories of personalized information needed for the configuration. Administrators can then fill out the required information and upload the CSV file using bulk import button 820 and apply the personalized information to multiple devices all at once.

Figure 9:
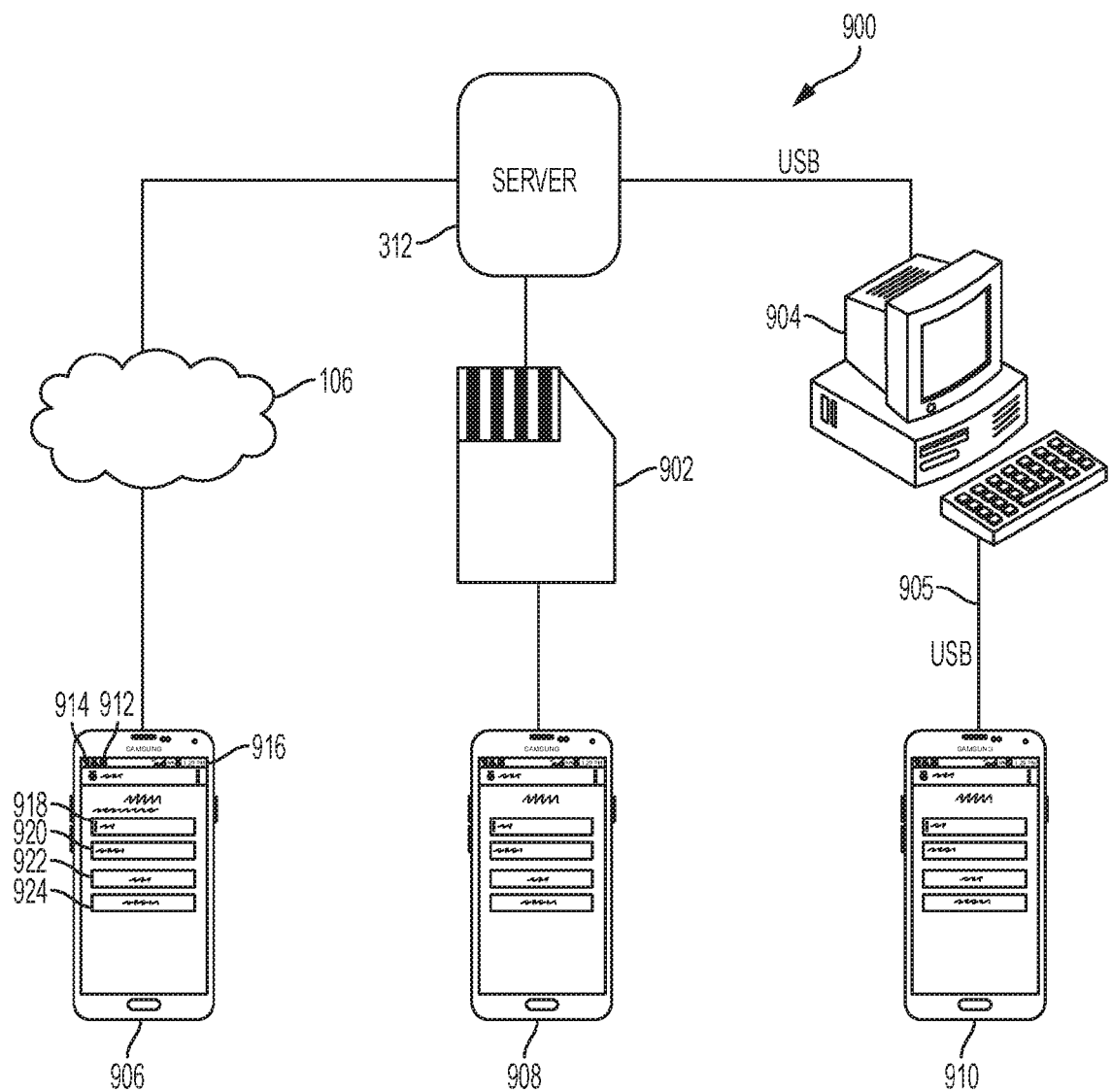
FIG. 9 shows a representative diagram of the method by which the system and method of the present invention may retrieve configurations from system servers, both over-the-air and in a connected environment.

FIG. 9 shows three different methods by which configurations stored on server 312 may be retrieved by smart devices, such as 906, 908, and 910. The first method is by having the high-speed application of the present invention installed on smart device 906. Using this method, smart device 906 may retrieve the desired configuration information over the internet through cloud 106. According to the second method, the configurations may be stored on an SD card, such as SD card 902, for offline transfer to smart device 908 with no external connections. This SD card may be input into a SD card slot on the smart device for this purpose. According to a third method, the configurations may be downloaded by computer 904 for local relay to smart device 910 using USB connection 905.

Figure 10:
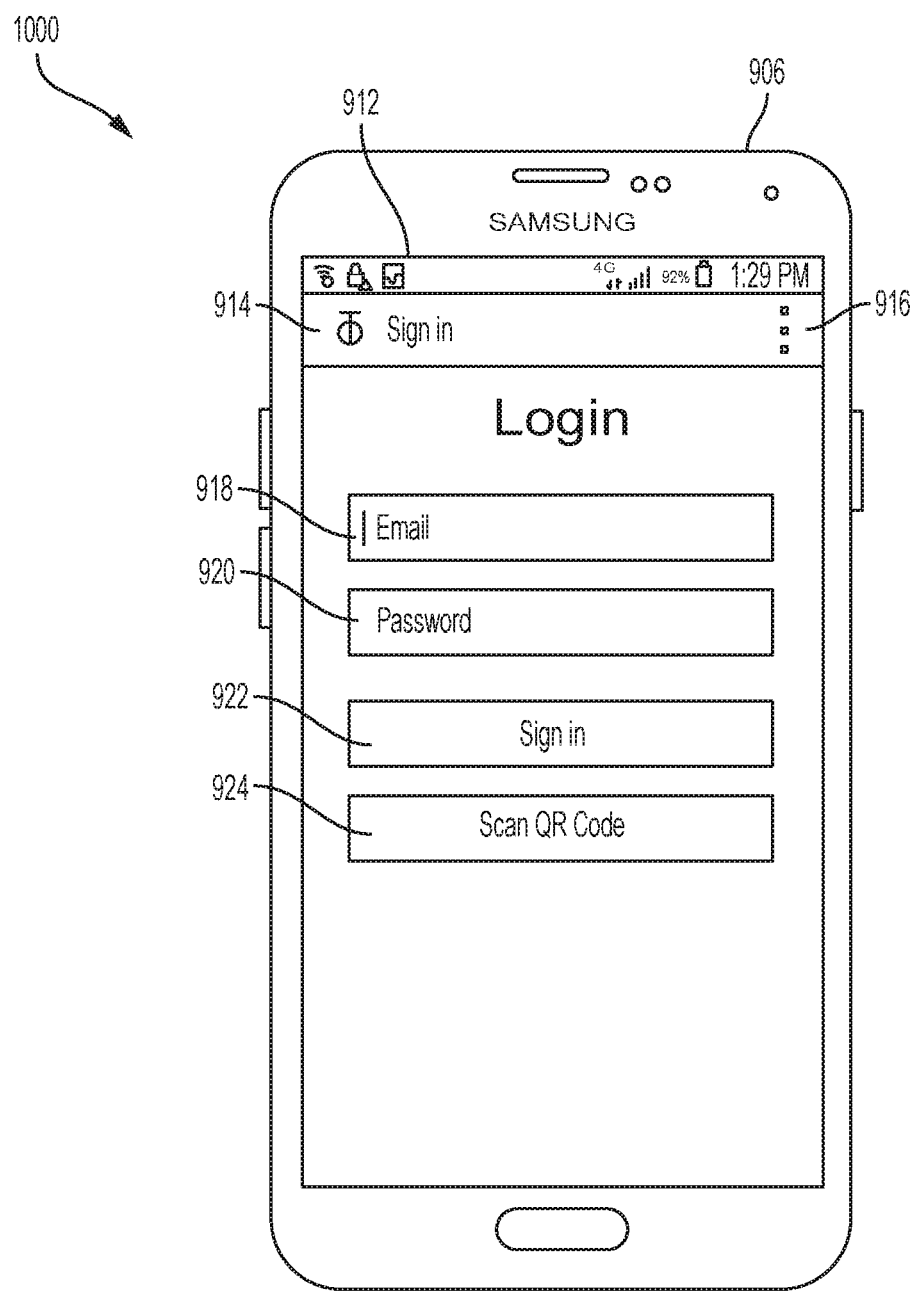
FIG. 10 shows a representation login screen display for a smart device in which the system of the present invention is installed.

For purposes of illustration only, smart devices 906, 908, and 910 include at least the features that are shown on smart device 906 in FIG. 9. For convenience, an enlarged view of smart device 906 is shown in FIG. 10. The smart device shown in FIG. 10 is meant to be representative of all categories of smart devices as it would be understood by a person of ordinary skill in the art.

Referring to FIG. 10, smart device 906 includes application home/login screen 912. By activating sign in button 914, the login/sign in screen is displayed as shown in FIG. 10. There is also menu button 916, which when activated provides the capability for accessing options. These options include, but are not limited to, links to the application's website over the Internet and an "about" page. The login screen includes user email input field 918 and user password input field 920. In logging in, the system user will provide the appropriate information in these input fields to open the application of the present invention.

When the system user has entered the appropriate information in email input field 918 and password input field 920, that system user will activate sign in button 922, which will sign the system user into the application of the present invention. The system user also has the option of activating scan QR code button 924 for using a QR code for signing into the application of the present invention. If scan QR code button 924 is activated, it will open a QR reader screen for the purpose of reading the QR code for accessing the application of the present invention. This reader screen will read the QR code and populate the credentials needed for accessing the application of the present invention. The login screen may also include a button (not shown) for starting a demonstration configuration, which may be entered without login and will be shown subsequently. This demonstration configuration is to help the system user understand the operation of the application of the present invention.

Figure 11:
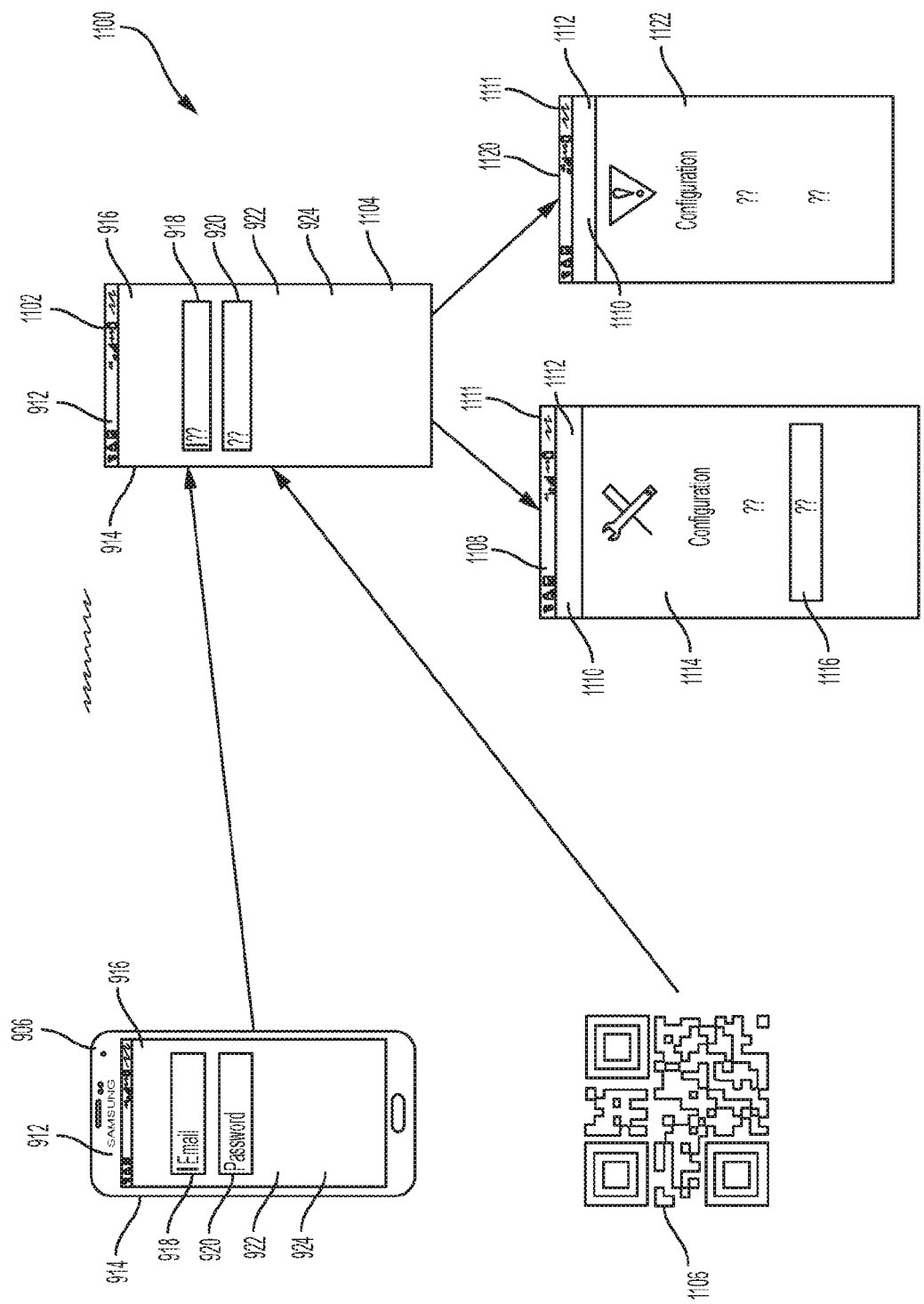
FIG. 11 shows a representation diagram for logging in to the system of the present invention and the actions to be taken whether or not a configuration exists for a smart device.

FIG. 11 shows the process for applying a configuration on a smart device and the verification process ensuring such configuration is properly implemented. Referring to FIG. 11, the process begins by logging into the application of the present invention. As stated previously, there are two methods of logging in, the first is by manually providing the system user credentials at 918 and 920 1102 or the second is using a QR code as shown at 1106. Once either of these methods are used, the login information is transmitted to server 312 for verification. Also shown at screen 1102 is demo button 1104 that has been previously described.

If the login information is correct and a configuration exists for the particular model of smart device, the application of the present invention will direct the process to what is shown at screen 1108. If the login information is incorrect, preferably, it will pop-up an error box and if no configuration exists for the smart device in use, the application of the present invention will direct the process to screen 1120. If the process is directed to screen 1108, it indicates the application title at 1110, which for example may be "Tachyon." The screen also includes menu button 1112, which, when activated, will provide the ability to log out in addition to the linking to the application's website and "about" pages. Refresh button 1111, when activated, will reload data from the server on which the configuration is stored. As shown in area 1114 of screen 1108, there is a narrative regarding the status of the configuration for the smart device when the system user activates "Begin Configuration" button 1116. When configurations are found for the device, they will be displayed in area 1114.

Referring to screen display 1120, if login credentials are incorrect or there are no configurations for the smart device, information will be displayed in area 1122. This screen display will also have the application name displayed at 1110 and the menu button 1112, which has been previously described. The screen display also includes refresh button 1111, which has been previously described. If the system user believes that incorrect login information was input to screen 1102 that caused screen 1120 to be displayed, the system user may reenter the correct information to gain access to the application of the present invention.

Figure 12:
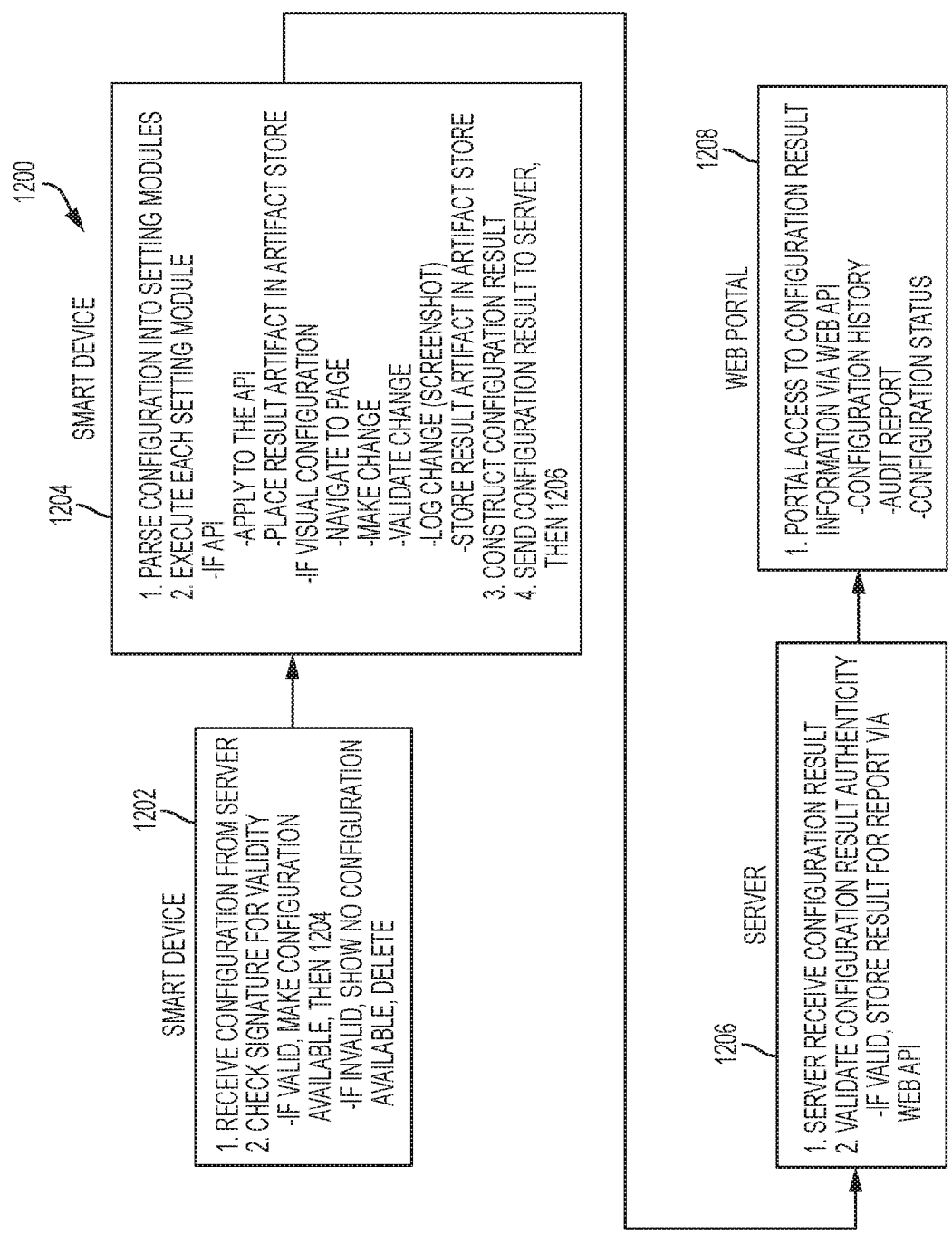
FIG. 12 shows a representation diagram of the interaction of smart devices, servers, and web portals according to the method of the present invention.

Referring to FIG. 12, generally at 1200, the process of making configurations available will be described in detail. Accordingly, a configuration, which may consist of bundled and cryptographically signed configuration instructions and personal data to be applied, is received by a smart device at step 1202 from server 312 (FIG. 3). When the smart device receives this configuration, it checks the cryptographic signature to determine its validity. If the smart device determines that the cryptographic signature is invalid, it will display that there is no configuration available and delete the configuration that was downloaded. If the smart device determines that the cryptographic signature is valid, it will make the configuration able to be run by the application of the present invention, and displays that a configuration is available and proceeds to step 1204

At step 1204, the smart device parses the configuration back into its setting module components with the personalized data integrated. Using the high-speed application of the present invention, the smart device preferably will begin executing the setting modules in a specific order. This order is determined by the setting module creator and the particular configuration being applied, e.g., setting modules, such as encryption, are typically executed at the end of configuration. If a setting module uses an API to apply settings to the smart device, a result artifact is placed in an artifact store to indicate that the action was successfully performed. Preferably, the artifact store will be located at the system servers on which configurations and audit data are stored. If a setting modules is designed to apply the setting though simulated touch events, the application of the present invention navigates through the menus of the smart device to the correct page and applies the setting using simulated human interaction before verifying that the setting was actually applied. Changes in this manner are logged though the use of a screenshot, as well through the creation of a result artifact, which is then stored in the artifact store. The high-speed application of the present invention continues through this process until all setting modules have been run, and it may then attempt to apply settings multiple times in the event of a failure to apply the desired settings on the first attempt.

After the smart device runs all setting modules indicated by the configuration, the application of the present invention will construct a configuration result indicating whether or not all the setting modules were applied correctly and send the configuration result to server 312 for storage and future reference.

As shown at step 1204, the configuration results are sent to the server and the process proceeds at step 1206. Referring to step 1206, server 312 (FIG. 3) receives the configuration results sent by the application of the present invention and validates the authenticity of the configuration results to ensure that the information actually originated from the application of the present invention. If the server determine the configuration results are valid, it will store the configuration results for reporting using the web API, and make the configuration results accessible in the web portal shown at step 1208 for administrators and system users through a browserable list of reports of configurations that have been run.

Referring to step 1208, the administrator or system user may access the configuration results on server 312 using the web portal. The web portal also provides administrators and system users with the configuration history of smart devices, including past configuration reports and audit reports. This information includes when configurations were applied, the configuration result, and the status of the configuration.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems. Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

While various embodiments have been described above, it should be understood that they have been presented by way of example only, and not limitation. For instance, advertisements may be placed with groups of objects, rather than individual objects, and still be within the scope of the present invention. As such, the breadth and scope of the preferred embodiments should not be limited by any of the above-described exemplary embodiments. Further, various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A computer-implemented system for mobile device configuration comprising:
    a mobile device that is capable of being configured and reconfigured that has downloaded thereon an application that permits the mobile device to be configured or reconfigured in an automated way through a wireless or wired connection to at least a portal device and a system server;
    a computer-based configuration menu that is capable of being displayed on the portal device for creating configurations for at least one version of the mobile device, with the configuration menu including one or more configurations that a system user may associate with the at least one version of the mobile device;
    a computer-based setting module menu that is accessed from the configuration menu that is capable of being displayed on the portal device for creating and editing settings for modules that are associated with at least one configuration being created on the configuration menu, with the setting module menu including at least an active module section and an available module section, and with the setting module menu being capable of adding modules from the available menu section to the active module section so such added modules will be included as part of the at least one configuration being created on the configuration menu and being capable of deleting modules from the active module section so that the deleted modules are not included as part of the at least one configuration being created on the configuration menu;
    a computer-based individual setting module menu that is accessed from the setting module menu that is capable of being displayed on the portal device, with the individual setting module menu for editing settings for at least modules that are located in the active module section of the setting module;
    a computer-based user menu that is accessed from at least the configuration menu that is capable of being displayed on the portal device, with the user menu for at least adding and deleting users from the system, with the user menu including at least a name of each user and a configuration status of the mobile devices associated with each user;
    a computer-based mobile device menu that is accessed from at least the configuration menu that is capable of being displayed on the portal device, with the mobile device menu for at least editing device information for devices associated with each user indicated on the user menu; and
    the system server that is accessed from at least the portal device, configuration menu, setting module menu, individual setting module menu, user menu, mobile device menu, and mobile device for storing the at least one configuration that was created and communicating the configuration that was created to the mobile device for configuring or reconfiguring the mobile device.

2. The system as recited in claim 1, wherein the mobile device includes a smart mobile device.

3. The system as recited in claim 2, wherein the smart mobile device includes a smart phones, tablet devices, and personal digital assistants ("PDAs").

4. The system as recited in claim 1, wherein the configuration menu is capable of accessing the mobile device menu and the user menu.

5. The system as recited in claim 1, wherein the settings module menu is capable of accessing the configurations menu, the mobile device menu, and the user menu.

6. The system as recited in claim 1, wherein the individual settings module menu is capable of accessing the configurations menu, the mobile device menu, and the user menu.

7. The system as recited in claim 1, wherein adding and deleting users includes adding and deleting users individually or adding and deleting two or more users simultaneously.

8. The system as recited in claim 1, wherein adding and deleting mobile device settings includes adding and deleting device settings individually or adding and deleting two more device settings simultaneously.

9. The system as recited in claim 1, wherein the portal device includes a computer-based device.

10. The system as recited in claim 9, wherein the portal device includes a computer including at least a processor, an input/output system, memory, and bus system interconnecting as the computer elements.

11. A computer-implemented method for verifying a configuration of a mobile device, comprising the steps of:
    (A) a mobile device downloading from a remote storage location an
    application for conducting configurations and reconfigurations of the mobile device;
    (B) the mobile device receiving from a system server a configuration for the mobile device that has been created and stored on the system sever, with the mobile device checking at least a cryptographic signature of the configuration to determine a validity of the configuration, and if the cryptographic signature is valid, then step (C);

(C) the mobile device running the application downloaded at step (A) with the configuration, and running the application with configuration including the substeps of, (1) parsing the configuration to provide setting modules of the configuration and the personalized data associated with each setting module, and (2) executing each setting module and storing results of the execution of each setting module in a predetermined storage location;

(D) the application constructing configuration results from the results stored in the predetermined storage location, with the configuration results indicating if each of the setting modules has been applied correctly to the mobile device;

(E) the mobile device transmitting the configuration results constructed at step (D) to the system server;

(F) the system server validating an authenticity of the configuration results, and if valid, the system server storing the configuration results for reporting to a remote computing system and transmitting the configuration results to a portal device for use in verifying the configuration of the mobile device.

12. The method as recited in claim 11, wherein the configuration includes at least bundled and cryptographically signed instructions and personalized data.

13. The method as recited in claim 11, wherein if the cryptographic signature is invalid at step (B), then the mobile device displaying on its display screen at least that no configuration is available and deleting the downloaded setting modules of the configuration and the personalized data associated with each setting module.

14. The method as recited in claim 11, wherein executing the setting modules in substep (C)(2) includes executing the setting modules in a predetermined order.

15. The method as recited in claim 11, wherein the predetermined storage location at substep (C)(2) includes an artifact store.

16. The method as recited in claim 15, wherein setting modules that use an application programming interface ("API") to apply setting to the mobile device store the results directly to the artifact store.

17. The method as recited in claim 15, wherein setting modules that apply setting to the mobile device through at least touch events applies the setting using simulated human interaction with the mobile device and logs such changes through a screenshot that is saved in system server as well as the results in the artifact store.

* * * * *